Sept. 18, 1951      S. SHATKIN      2,568,688

LIPSTICK CASE

Filed March 19, 1949

SIDNEY SHATKIN,
INVENTOR.

By
ATTORNEY

Patented Sept. 18, 1951

2,568,688

UNITED STATES PATENT OFFICE 2,568,688

LIPSTICK CASE

Sidney Shatkin, Long Branch, N. J., assignor to Crest Silver Mfg. Co. Inc., Matawan, N. J., a corporation of New Jersey Application March 19, 1949, Serial No. 82,307

6 Claims. (Cl. 206—56)

The present invention relates to cases for lip sticks, and more particularly to the type wherein a pomade stick is housed within a casing having a removable cover or cap. Upon removal of the cap, the pomade stick may be shifted in some manner, so that it shall extend exterior of the casing in position for use, and to be withdrawn into the casing, when not in use. In the present invention, the cap is used to propel the pomade stick.

The principal object of this invention is to provide a lip stick case of the character mentioned, of novel and improved construction, which comprises a minimum of parts, uses the cap in its normal movements to propel the pomade stick, is simple and cheap in construction, easy to use and efficient in carrying out the purposes for which it is designed.

Other objects and advantages will become apparent as this disclosure proceeds.

In the accompanying drawings forming part of this specification, similar characters of reference indicate corresponding parts in all the views.

Figure 1:
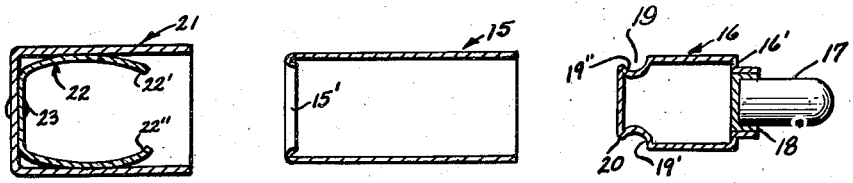
Fig. 1 is an "exploded" view showing in section, all the parts comprising an embodiment of this invention. This is a central longitudinally sectional view of such parts.

In the drawings, the numeral 15 designates generally a tubular housing, within which fitted for longitudinal slidable movement with friction, is a carrier 16 holding the pomade stick 17 which extends from said carrier towards one end of the tubular casing 15. The pomade stick is concentrically spaced from the interior wall of the outer casing member 15. Said casing member 15, at its other end which may be called its base end, has an inward annular bead 15'. The pomade stick carrier 16 has a shoulder at 16' around the socket 18, while the other end of said carrier is formed with an annular channel indicated by the numeral 19, about its circumferential surface. The reduced end 20 of the carrier 16 can travel through the beaded end of the outer casing as is shown in Fig. 2, and into the casing hugged by the arms of the spring 22 as shown in Fig. 4.

The cap 21, is an open-mouthed shell, within which it carries a narrow blade spring 22 which is shaped as the letter U. This spring is secured by any suitable means at 23, so that the arms of said U-shaped blade spring, which may be of resilient steel wire, extend longitudinally of said cap, and terminate near the mouth thereof in the inwardly bent fingers 22' and 22", respectively. Said cap 21, is of a dimension, to slidably fit onto the casing member 15, with some friction attending its movement thereon. The said fingers 22' and 22" are a bit inward of the mouth of the cap 21, so that the said cap can be mounted a bit onto either end of the casing 15, before the said fingers are called upon to function as will be explained, to accomplish the required movements of the pomade carrier 16.

Figure 2:
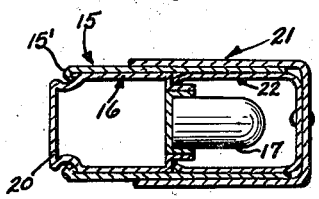
Fig. 2 is a central longitudinal sectional view of the device in non-use condition, as it is carried in a lady's hand bag.
Figure 3:
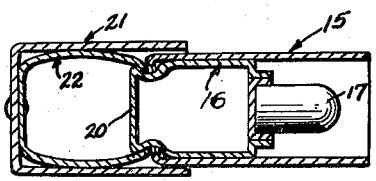
Fig. 3 is a similar view showing the cap removed from the end of the casing through which the pomade stick emerges, and said cap just starting to be put onto the opposite end of the casing.

Referring now to Fig. 2, the device is shown in closed condition. To set into use condition, the cap 21 is removed from the open end of the casing 15, through which the pomade stick 17 is to emerge, and set onto the other end of said casing 15 as shown in Fig. 3. When the spring fingers 22' and 22" reach the head 20 of the carrier 16, said fingers will spread apart due to the cam action of the rounded edge of said head 20 and will enter the annular channel 19 and press against wall 19' thereof and then enter the casing 15, pushing the carrier 16 until the pomade stick 17 is exposed as in Fig. 4, which is the use position of the article. The friction between the carrier 16 and the casing member 15, is great enough to permit the fingers 22' and 22" to "jump" over the head 20, without moving said carrier until said spring fingers push against wall 19'.

Figure 4:
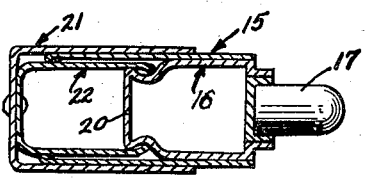
Fig. 4 is a similar view showing the cap fully pushed onto said opposite end of the casing, whereby the pomade stick has been caused to emerge to its use position.

It is to be noted that as the cap 21 is moved on the casing from its position as in Fig. 2, to the position of said cap as illustrated in Fig. 4, the bead 15' acts to maintain the fingers 22' and 22" within the channel 19.

Figure 5:
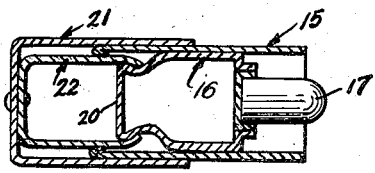
Fig. 5 is another similar view showing the cap being moved off the casing and thereby automatically causing the pomade stick to reenter within the casing.

To move the carrier 16 back into the casing 15, the cap 21 is pulled off the casing 15. Such movement of the cap, causes the fingers 22' and 22" to move away from wall 19' and contact wall 19", whereupon the carrier will be pulled into the casing until said carrier 16 is stopped by the bead 15' which serves as a stop member therefor, when said bead is contacted by the wall 19'. Fig. 3 shows this latter condition, while Fig. 5 shows the carrier 16 being drawn into the casing 15.

When the carrier 16 is at its ultimate position within the case, its reduced end 20 protrudes out of the base end of the case, whereupon the stop member 15' is no more in contact with the carrier-moving member 22, and upon further movement of the cap to separate itself from the casing 15, the head 20 acts to bend the arms of 22 so that the member 22 becomes free of the carrier 16. The carrier-moving member 22 has thus been called upon to push the carrier 16 so that pomade stick 17 is exposed from the mouth end of the casing 15, and then to pull the carrier back into the casing so that the cap after its removal from the base end of the casing, could again be set to cover the mouth end of the casing as in Fig. 2.

It is advisable that the parts shall be so dimensioned, that the arms of the carrier-moving member 22 shall push against seat or wall 16' of the carrier when the cap 21 is mounted on the mouth end of the casing 15, so that the said carrier shall have no free movement when the casing is in closed condition as in Fig. 2.

The foregoing assumes that head 20 is of a size to intercept the fingers 22' and 22" and spread them apart before they could pass said head. However, said head 20 may be small enough to have such fingers clear it, in which event the bead 15 will act as a cam to shift said fingers into the channel 19 and maintain them there when the spring 22 is within the casing 15 at base end. The necessity of said fingers to "jump" the said head is therefore eliminated and altho in such instance the pulling back of the carrier 16 is a little short of being against the bead 15', the inward travel of the carrier is completed when the cap 21 covers the mouth end of the casing as in Fig. 2, for the fingers of the spring 22 will have pushed the carrier against the bead 15'.

For practical construction, the three principal members 15, 16 and 21 are made of circular cross section, or of regular polygonal cross section, though other shaped are adaptable. Suitable materials therefor are metal, plastic, fibre and the like.

This invention is capable of numerous forms and various applications without departing from the essential features herein disclosed. It is therefore intended and desired that the embodiments herein shall be deemed illustrative and not restrictive and that the patent shall cover all patentable novelty herein set forth; reference being had to the following claims rather than to the specific description herein to indicate the scope of this invention.

I claim:

1. In a lip stick case of the character described, a tubular casing having an open mouth end and an open base end, a lip stick carrier positioned within the casing and slidable therealong therein; said carrier having a reduced end extending therefrom towards the base end of the casing; said reduced end of the carrier having at least part of an annular channel, a lip stick extending from the carrier towards the mouth end of the casing, spaced from the interior of the casing, a cap having a mouth end positionable onto each end of the casing, at one end of the casing at any one time and slidable along the casing, an elongated resilient carrier-moving member carried by the cap and positioned therewithin, extending free towards the mouth end of the cap and movable into the casing when the cap is mounted on either end of the casing and moved along the casing; said carrier-moving member having a finger at free end; said finger extending towards the base of the channel when the cap is mounted on the base end of the casing; said carrier-moving member and its finger being spaced from the lip stick when the cap is mounted on the mouth end of the casing and moved therealong towards the base end of the casing and a member extending inwardly from the wall of the casing at the base end of said casing, to serve as a stop for the carrier when the carrier is moved up to said stop member; said stop member when contacted by the carrier-moving member in motion into the casing causing said carrier-moving member to bend so that said finger enters and is held in the channel in the reduced end of the carrier whereby upon movement of the cap onto the base end of the casing towards the mouth end of said casing, said finger will be bent by said stop member and moved thereby into the channel in the reduced end of the carrier and said finger will push the carrier towards the mouth end of the casing to expose the lip stick to use position and then upon reverse movement of the cap, said finger will pull the carrier towards the base end of the casing and draw the lip stick wholly within the casing; the carrier-moving member being capable of entrance through the base end of the casing with its finger past said stop member, upon mounting the cap onto and along the base end of the casing towards the mouth end of the casing.

2. A lip stick case as defined in claim 1, wherein the reduced end of the carrier protrudes out of the base end of the casing when the carrier is at the stop member, and wherein the mentioned finger extends in the path of said reduced end of the carrier when the cap is moved for mounting same onto the base end of the casing; the free end of said reduced end of the carrier when contacted by said finger, causing said finger to move and pass onto such reduced end of the carrier and into the channel, upon mounting and movement of the cap onto the base end of the casing when the carrier is at the stop member; said finger, when the carrier is at the stop member and the cap is moved further off the base end of the casing, will be bent and moved as it slides along the wall of the channel which is lateral to the line of movement of said cap, thereby leaving said channel and releasing said carrier-moving member from the reduced end of the carrier.

3. A lip stick case as defined in claim 2, wherein at least part of the mentioned channel protrudes out of the casing when the carrier is at the stop member.

4. In a lip stick case of the character described, a tubular casing having an open mouth end and an open base end, a lip stick carrier positioned within the casing and slidable therealong therein; said carrier having a reduced end extending therefrom towards the base end of the casing; said reduced end of the carrier having at least part of an annular channel, a lip stick extending from the carrier towards the mouth end of the casing, spaced from the interior of the casing, a cap having a mouth end positionable onto each end of the casing, at one end of the casing at any one time and slidable along the casing, an elongated resilient carrier-moving member carried by the cap and positioned therewithin, extending free towards the mouth end of the cap and movable into the casing when the cap is mounted on either end of the casing and moved along the casing; said carrier-moving member having a plurality of spaced fingers at free end; said fingers extending towards the base of the channel when the cap is mounted on the base end of the casing; said carrier-moving member and its fingers being spaced from the lip stick when the cap is mounted on the mouth end of the casing and moved therealong towards the base end of the casing and a member extending inwardly from the wall of the casing at the base end of said casing, to serve as a stop for the carrier when the carrier is moved up to said stop member; said stop member when contacted by the carrier-moving member in motion into the casing, causing said carrier-moving member to bend so that said fingers move towards each other, enter and are held in the channel in the reduced end of the carrier, whereby upon movement of the cap onto the base end of the casing towards the mouth end of said casing, said fingers will be bent by said stop member towards each other and into the channel in the reduced end of the carrier, and said fingers will push the carrier towards the mouth end of the casing to expose the lip stick to use position and then upon reverse movement of the cap, said fingers will pull the carrier towards the base end of the casing and draw the lip stick wholly within the casing; the carrier-moving member being capable of entrance through the base end of the casing with its fingers past said stop member, upon mounting of the cap onto and along the base end of the casing towards the mouth end of the casing.

5. A lip stick case as defined in claim 4, wherein the reduced end of the carrier protrudes out of the base end of the casing when the carrier is at the stop member, and wherein the mentioned fingers extend in the path of said reduced end of the carrier when the cap is moved for mounting same onto the base end of the casing; the free end of the reduced end of the carrier when contacted by said fingers, causing said fingers to move apart and pass onto such reduced end of the carrier and into the channel, upon mounting and movement of the cap onto the base end of the casing when the carrier is at the stop member; said fingers, when the carrier is at the stop member and the cap is moved further off the base end of the casing, will be bent and moved apart as they slide along the wall of the channel which is lateral to the line of movement of the cap, thereby leaving said channel and releasing the carrier-moving member from the reduced end of the carrier.

6. A lip stick case as defined in claim 5, wherein at least part of the mentioned channel protrudes out of the casing when the carrier is at the stop member.

SIDNEY SHATKIN.

REFERENCES CITED

The following references are of record in the file of this patent:

FOREIGN PATENTS

| Number | Country | Date |
| --- | --- | --- |
| 712,058 | France | July 13, 1931 |
| 715,889 | France | Sept. 29, 1931 |